(12) United States Patent
Yasue et al.

(10) Patent No.: US 10,544,760 B2
(45) Date of Patent: Jan. 28, 2020

(54) EGR GAS DISTRIBUTOR

(71) Applicant: AISAN KOGYO KABUSHIKI KAISHA, Obu-shi, Aichi-ken (JP)

(72) Inventors: Akinari Yasue, Tokai (JP); Hironori Suzuki, Obu (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 16/162,717

(22) Filed: Oct. 17, 2018

(65) Prior Publication Data
US 2019/0170095 A1 Jun. 6, 2019

(30) Foreign Application Priority Data
Dec. 6, 2017 (JP) ................................. 2017-234140

(51) Int. Cl.
| | | |
|---|---|---|
| *F02B 47/08* | (2006.01) | |
| *F02M 35/10* | (2006.01) | |
| *F02M 26/21* | (2016.01) | |
| *F02B 29/04* | (2006.01) | |
| *F02M 26/41* | (2016.01) | |
| *F02M 26/42* | (2016.01) | |
| *F02M 35/104* | (2006.01) | |

(Continued)

(52) U.S. Cl.
CPC ... *F02M 35/10222* (2013.01); *F02B 29/0475* (2013.01); *F02M 26/21* (2016.02); *F02M 26/32* (2016.02); *F02M 26/41* (2016.02); *F02M 26/42* (2016.02); *F02M 35/104* (2013.01); *F02M 26/30* (2016.02)

(58) Field of Classification Search
CPC ........... F02M 35/10222; F02M 35/104; F02M 26/32; F02M 26/41; F02M 26/42; F02M 26/21; F02M 26/30; F02B 29/0475
USPC ............................................ 123/568.12, 573
See application file for complete search history.

(56) References Cited

U.S. PATENT DOCUMENTS 4,413,605 A * 11/1983 Leoni .................... F02M 31/087
 123/547
7,305,958 B2 * 12/2007 Doko ............... F02M 35/10039
 123/184.21

(Continued)

FOREIGN PATENT DOCUMENTS

| JP | 2005-155448 A | 6/2005 |
|---|---|---|
| JP | 2006-241992 A | 9/2006 |
| JP | 2018-044518 A | 3/2018 |

*Primary Examiner* — Hai H Huynh
(74) *Attorney, Agent, or Firm* — Oliff PLC

(57) ABSTRACT

The EGR gas distributor is attached to an intake manifold to distribute EGR gas to each of branch pipes constituting the intake manifold. The EGR gas distributor includes a gas distribution part including a gas inlet port for EGR gas, a plurality of gas outlet ports connected to each corresponding branch pipe, and a gas passage that extends by branching off into a plurality of branch sections from the gas inlet port to each gas outlet port. The gas passage has a tournament branch shape that extends by stepwise branching off from the gas inlet port to each gas outlet port and is symmetric about the gas inlet port. The EGR gas distributor includes a heating part provided adjacent to the entire gas distribution part to heat the gas distribution part. The heating part is constituted of a hot-water passage part configured to allow hot water to flow therethrough.

8 Claims, 14 Drawing Sheets

(51) Int. Cl.
*F02M 26/32* (2016.01)
*F02M 26/30* (2016.01)

(56) References Cited

U.S. PATENT DOCUMENTS

| | | | |
|---|---|---|---|
| 9,038,608 B2 * | 5/2015 | Vigild | F02M 31/13 |
| | | | 123/179.21 |
| 10,190,546 B2 * | 1/2019 | Yoshioka | F02M 35/10222 |
| 10,208,715 B1 * | 2/2019 | Wicks | F02F 1/243 |
| 2006/0191505 A1 | 8/2006 | Doko et al. | |

\* cited by examiner

EGR GAS DISTRIBUTOR

CROSS-REFERENCE TO RELATED APPLICATIONS

This application is based upon and claims the benefit of priority from the prior Japanese Patent Application No. 2017-234140 filed on Dec. 6, 2017, the entire contents of which are incorporated herein by reference.

BACKGROUND

Technical Field

The present disclosure relates to an EGR (Exhaust Gas Recirculation) gas distributor to be attached to an intake manifold in use to distribute EGR gas to a plurality of cylinders of an engine.

Related Art

As the above type of technique, conventionally, there has been known for example a gas distribution part of an intake manifold disclosed in Japanese unexamined patent application publication No. 2006-241992 (JP2006-241992A). This intake manifold will be mounted together with an engine in a vehicle and is provided with a surge tank and a plurality of intake pipes (branch pipes) branched from the surge tank in one-to-one correspondence to cylinders of the engine. The gas distribution part is configured to distribute auxiliary gas, such as EGR gas and PCV gas, to each of the branch pipes. This gas distribution part includes a gas inlet port connected to a single gas supply source, gas outlet ports that open into each of the branch pipes, and a gas passage that extends by branching off into a plurality of branch sections from the gas inlet port to each gas outlet port. The gas passage is designed such that the pressure loss in each branch section from the gas inlet port to each gas outlet port is equal between the branch sections. The gas passage has a tournament branch shape that extends by stepwise branching from the gas inlet port to each gas outlet port and is symmetric about the gas inlet port. According to this configuration, in which the gas passage takes the tournament branch shape, the EGR gas distributor can appropriately distribute EGR gas to each of the branch pipes.

SUMMARY

Technical Problem

However, when EGR gas is adopted as the auxiliary gas, for example, the technique disclosed in JP2006-241992A may cause condensed water to be generated from water or moisture contained in the EGR gas in the gas passage during cold start or others of the engine. If this condensed water flows in a branch pipe(s) through the corresponding gas outlet port(s), it may be sucked into the cylinder(s), thus causing misfire in the engine. To avoid such a defect, it is usually arranged to delay introduction of EGR gas into the intake manifold until the gas passage is warmed to a certain degree. However, this delay of introduction of EGR gas into the intake manifold makes it impossible to introduce EGR gas into the engine by just that much, so that fuel economy of the engine could not be improved. Herein, in order to prevent the delay of EGR gas introduction into the engine, it is necessary to quickly warm the gas passage to thereby suppress the generation of condensed water.

The present disclosure has been made to address the above problems and has a purpose to provide an EGR gas distributor capable of effectively quickly warm a gas passage while enhancing the performance of distributing EGR gas.

Means of Solving the Problem

To achieve the above-mentioned purpose, one aspect of the present disclosure provides an EGR gas distributor that is an attachment device to be attached to an intake manifold and is configured to distribute EGR gas to each of a plurality of branch pipes constituting the intake manifold, the EGR gas distributor comprising: a gas distribution part including: a single gas inlet port configured to allow EGR gas to flow in the gas distribution part; a plurality of gas outlet ports connected to each of the branch pipes; and a gas passage configured to extend by branching off into a plurality of branch sections from the gas inlet port to each of the gas outlet ports, the gas passage having a tournament branch shape that extends by stepwise branching off from the gas inlet port to each of the gas outlet ports and is symmetric about the gas inlet port; and a heating part provided adjacent to the entire gas distribution part to heat the gas distribution part.

According to the present disclosure, the above configuration can effectively quickly warm the gas passage while enhancing the performance of distributing EGR gas.

DETAILED DESCRIPTION OF THE EXEMPLARY EMBODIMENTS

First Embodiment

A detailed description of an embodiment of an EGR gas distributor of this disclosure will now be given referring to the accompanying drawings.

(Relationship Between EGR Gas Distributor and Intake Manifold)

Figure 1:
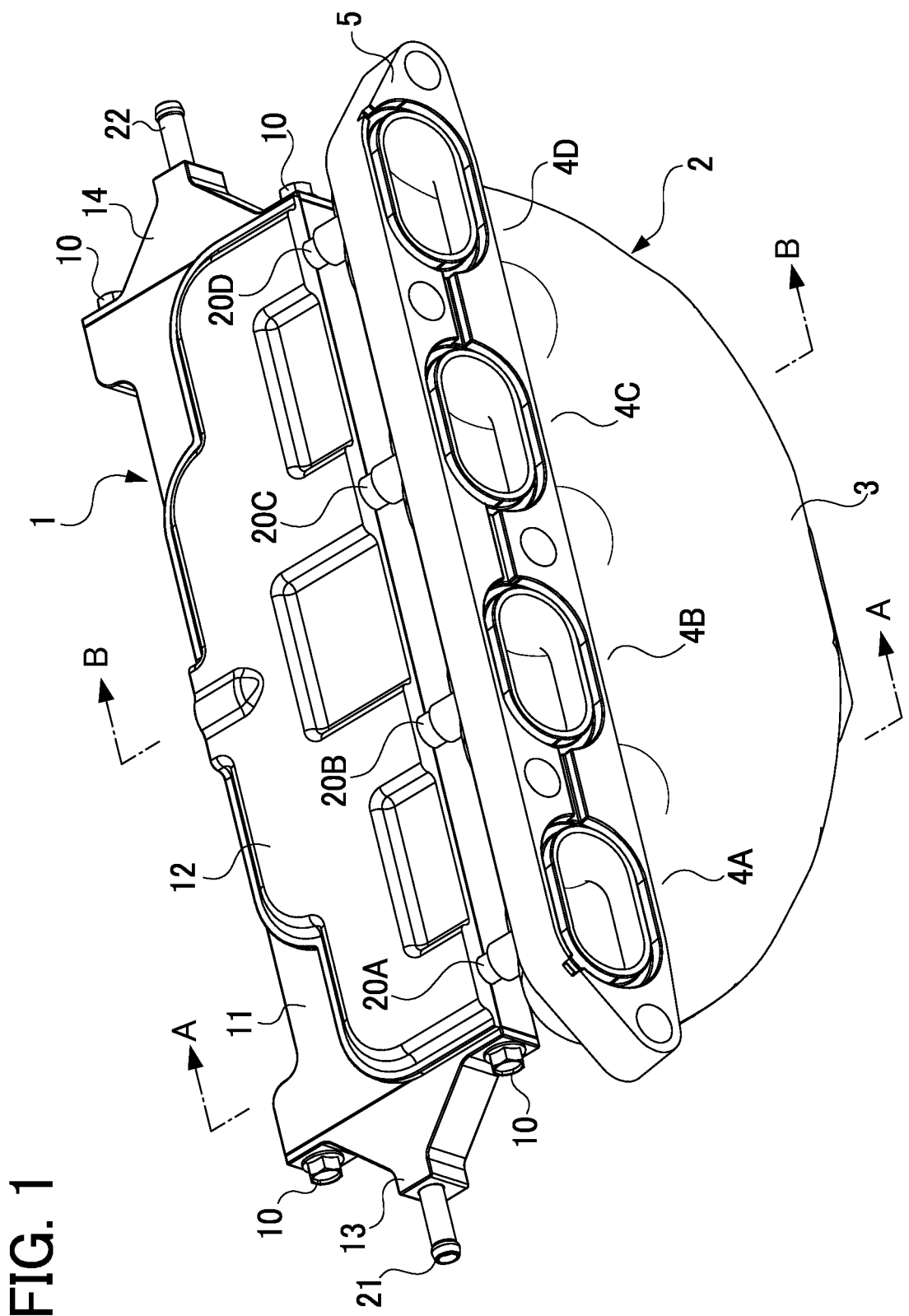
FIG. 1 is a perspective view showing an EGR gas distributor attached to an intake manifold in a first embodiment.
Figure 2:
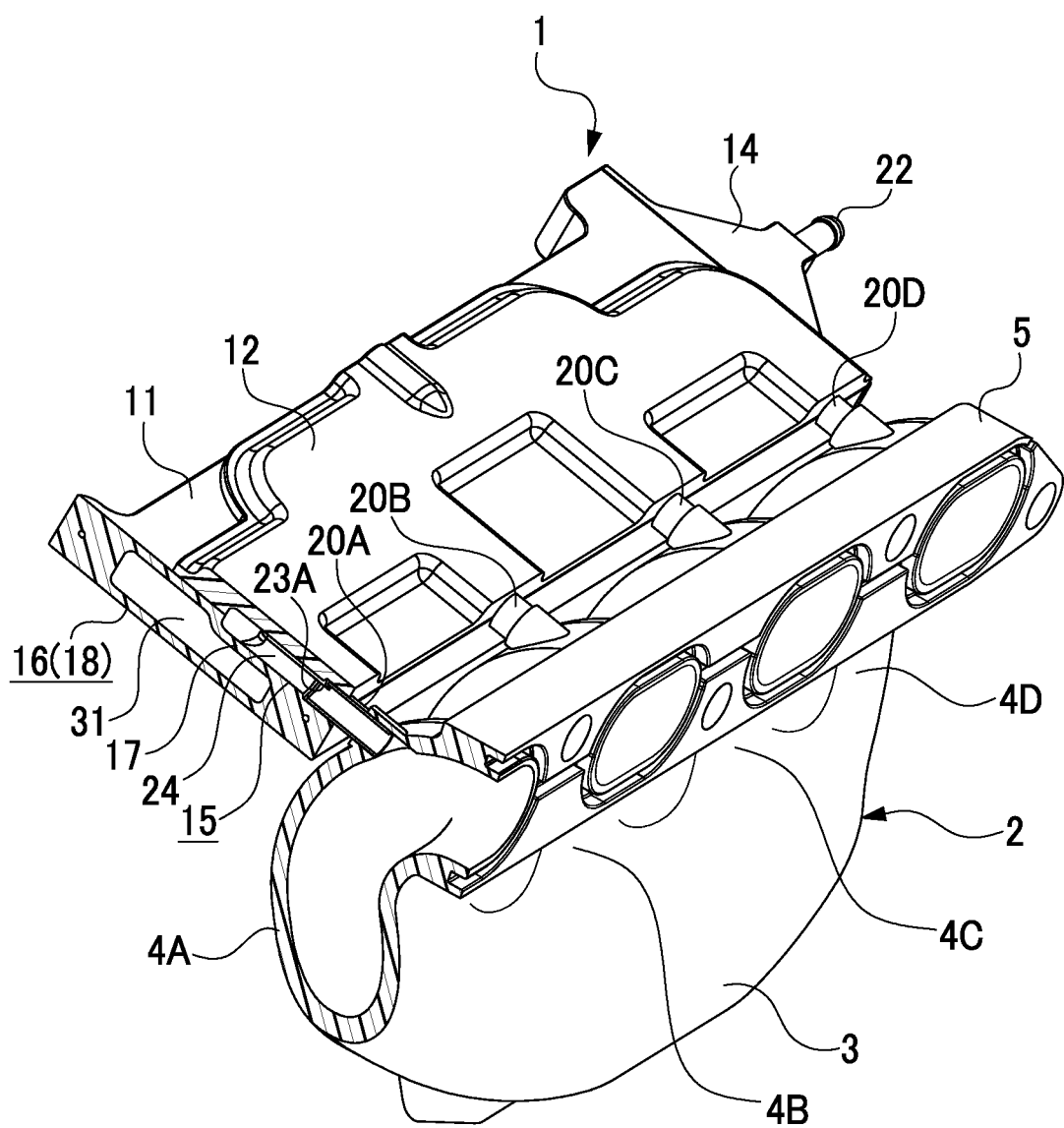
FIG. 2 is a partial cutaway, perspective view of the EGR gas distributor and the intake manifold shown in FIG. 1, taken along a vertical plane passing through a line A-A perpendicular to a longitudinal direction of the EGR gas distributor at a position of a gas outlet port in the first embodiment.
Figure 3:
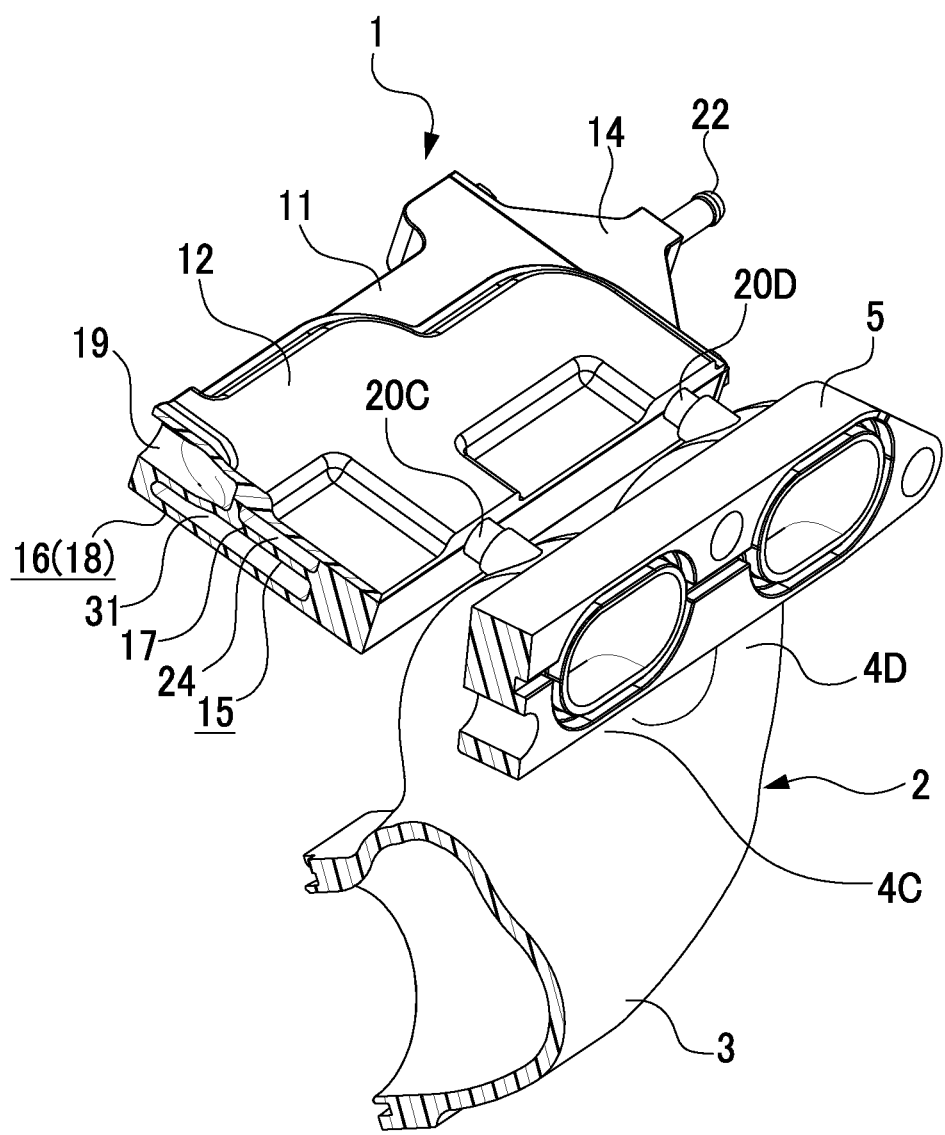
FIG. 3 is a partial cutaway, perspective view of the EGR gas distributor and the intake manifold shown in FIG. 1, taken along a vertical plane passing through a line B-B perpendicular to the longitudinal direction of the EGR gas distributor at a position of a gas inlet port in the first embodiment.
Figure 4:
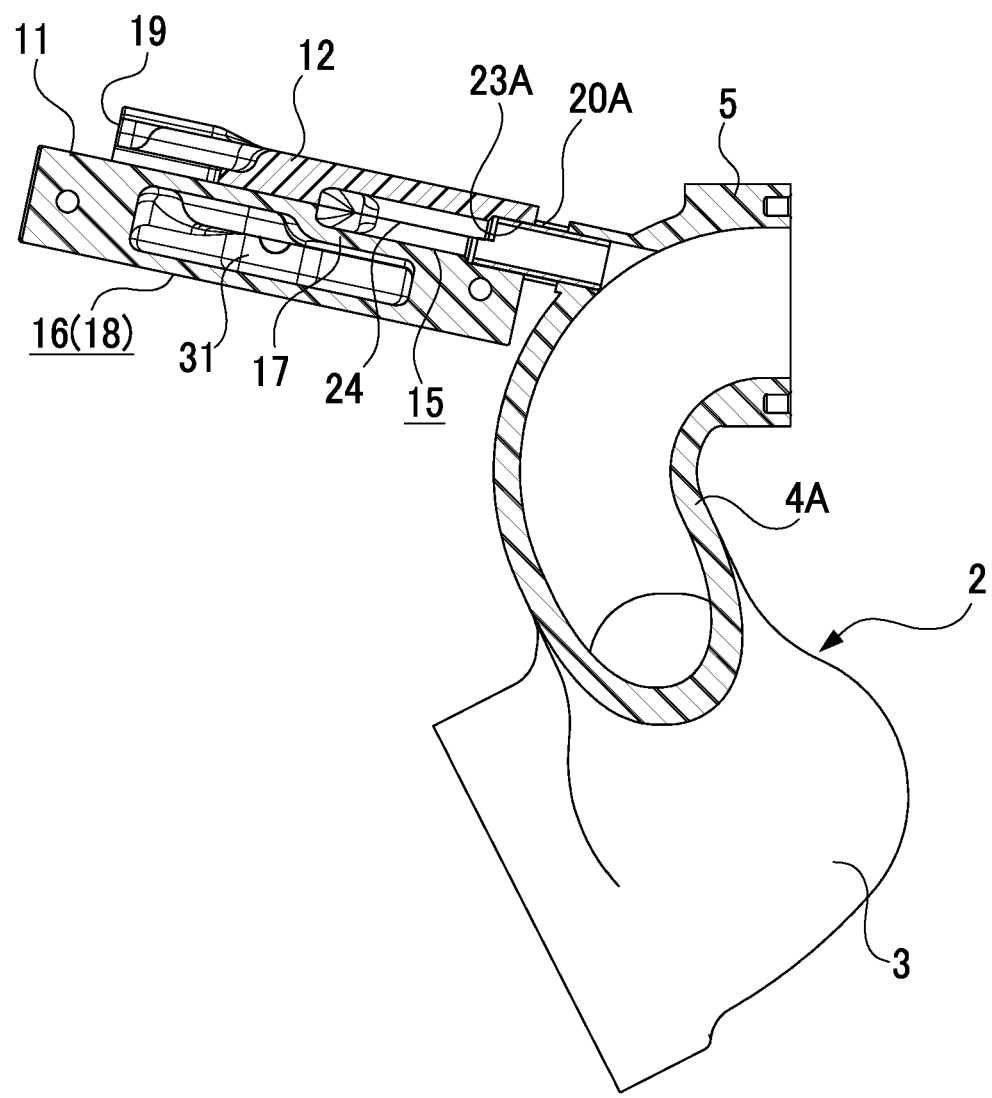
FIG. 4 is a cross-sectional view showing a cut plane of the EGR gas distributor and the intake manifold shown in FIG. 2 in the first embodiment.
Figure 5:
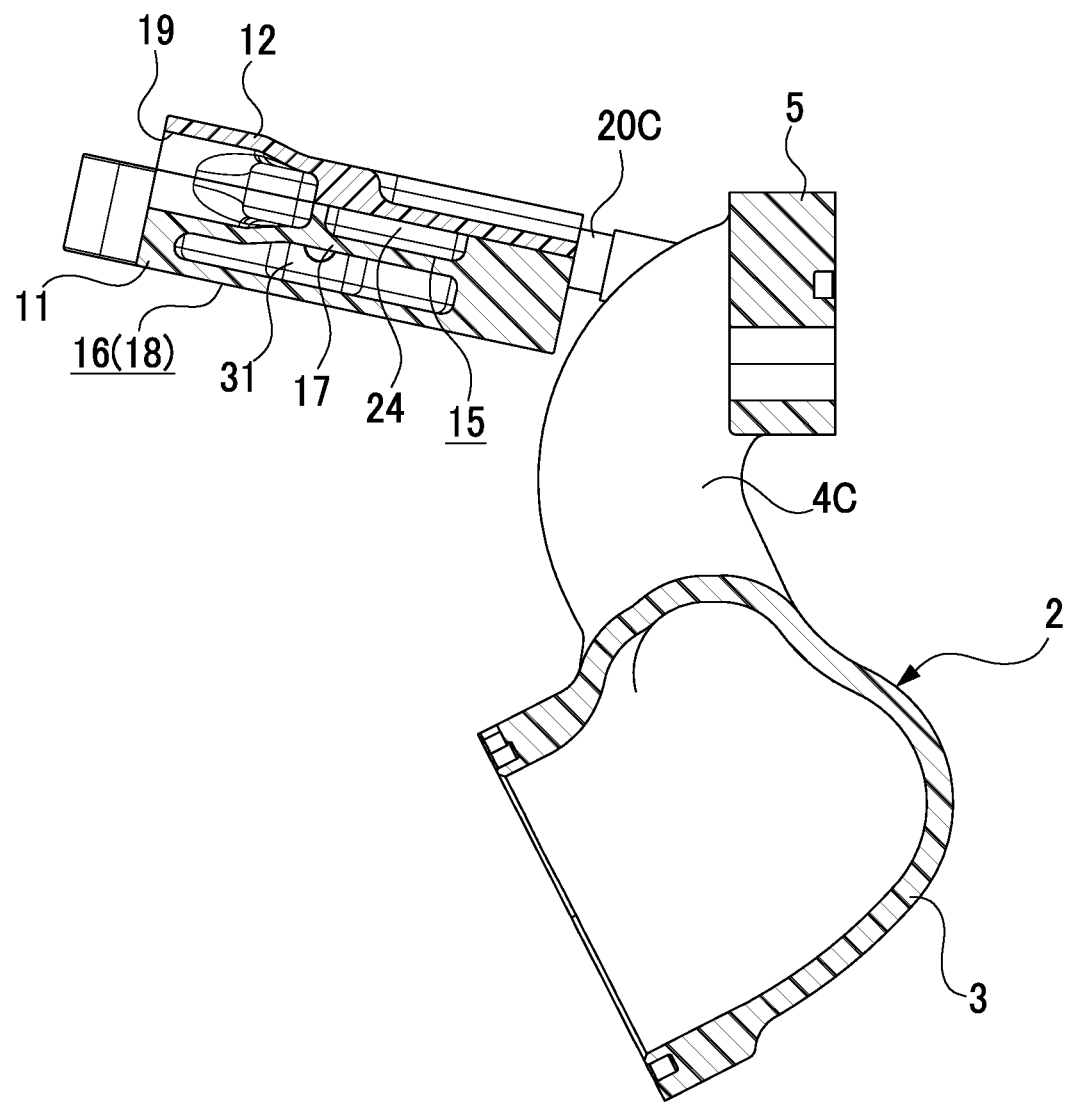
FIG. 5 is a cross-sectional view showing a cut plane of the EGR gas distributor and the intake manifold shown in FIG. 3 in the first embodiment.

FIG. 1 is a perspective view of an EGR gas distributor 1 attached to an intake manifold 2. FIG. 2 is a perspective view of the EGR gas distributor 1 and the intake manifold 2 shown in FIG. 1, taken along a vertical plane passing through a line A-A perpendicular to a longitudinal direction of the EGR gas distributor 1 at a position of a gas outlet port 23A. FIG. 3 is a perspective view of the EGR gas distributor 1 and the intake manifold 2 shown in FIG. 1, taken along a vertical plane passing through a line B-B perpendicular to the longitudinal direction of the EGR gas distributor at a position of a gas inlet port 19. FIG. 4 is a cross-sectional view showing a cut plane of the EGR gas distributor 1 and the intake manifold 2 in FIG. 2. FIG. 5 is a cross-sectional view showing a cut plane of the EGR gas distributor 1 and the intake manifold 2 in FIG. 3.

The posture of the EGR gas distributor 1 shown in FIG. 1 represents a configuration state of the EGR gas distributor 1 when attached to the intake manifold 2 mounted in an engine. The orientation of the EGR gas distributor 1 in the engine in vertical and lateral directions is defined as shown in FIG. 1. The intake manifold 2 is provided, as is known, with a surge tank 3, a plurality of branch pipes 4A, 4B, 4C, and 4D each branched from the surge tank 3, and an outlet flange 5 connecting each of the branch pipes 4A to 4D to the engine. In the present embodiment, the intake manifold 2 includes four branch pipes 4A to 4D corresponding to a 4-cylinder engine and is made of resin. The EGR gas distributor 1 is an attachment device to be attached to the intake manifold 2 in use to distribute EGR gas to each of the branch pipes 4A to 4D of the intake manifold 2.

(Outline of EGR Gas Distributor)

Figure 6:
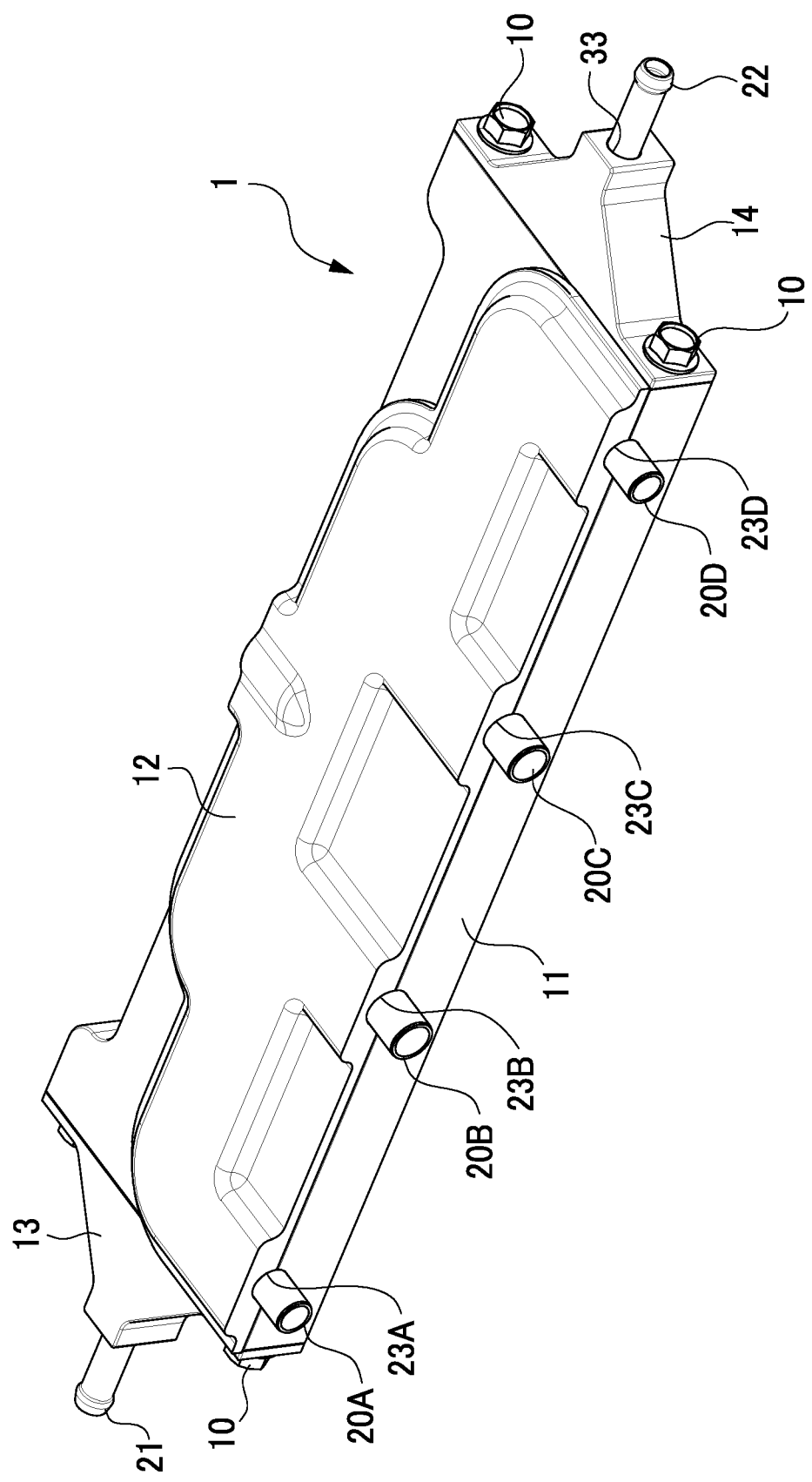
FIG. 6 is a perspective view of the EGR gas distributor seen from the front side in the first embodiment.
Figure 7:
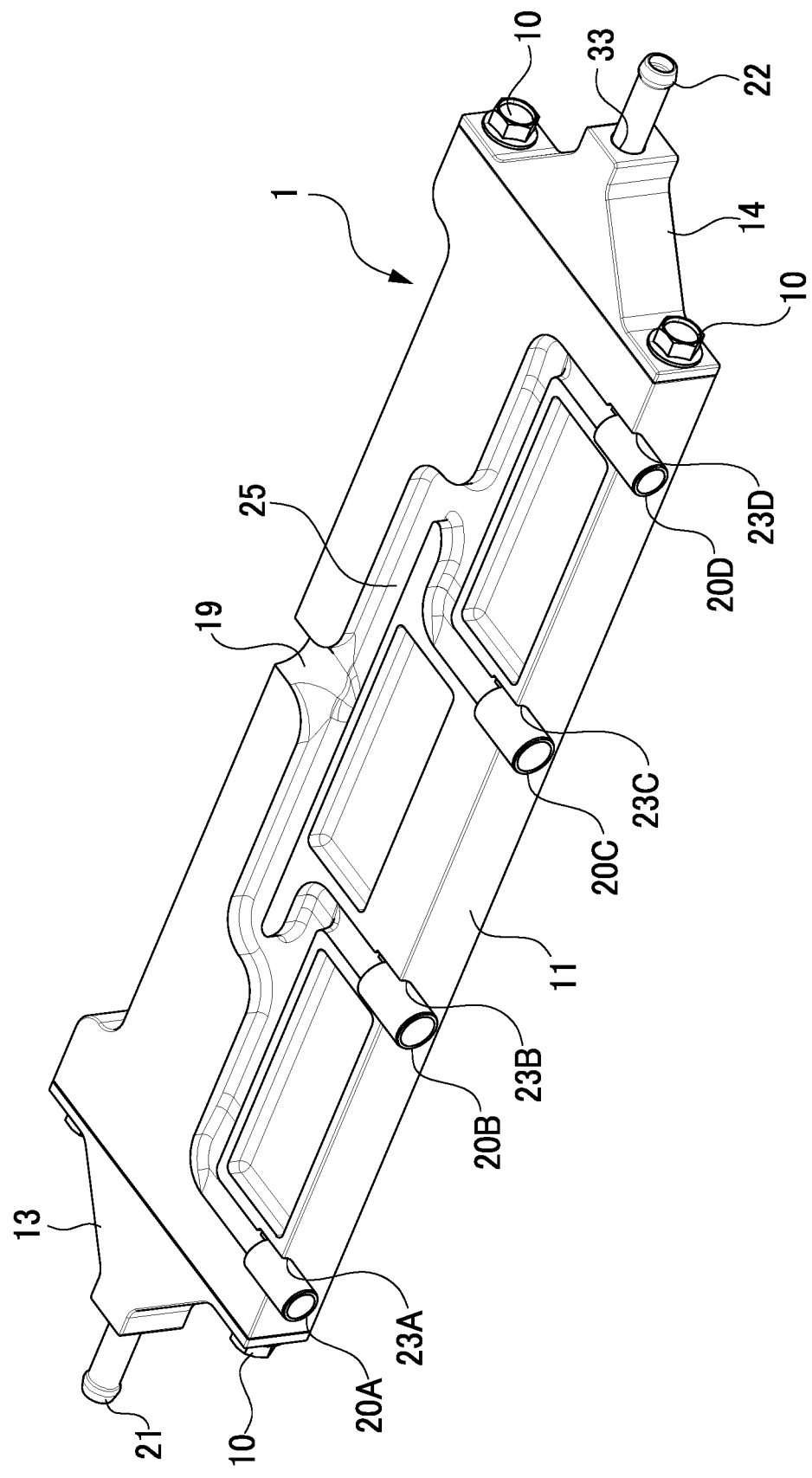
FIG. 7 is a perspective view of the EGR gas distributor in FIG. 6, from which a cover member is removed, in the first embodiment.
Figure 8:
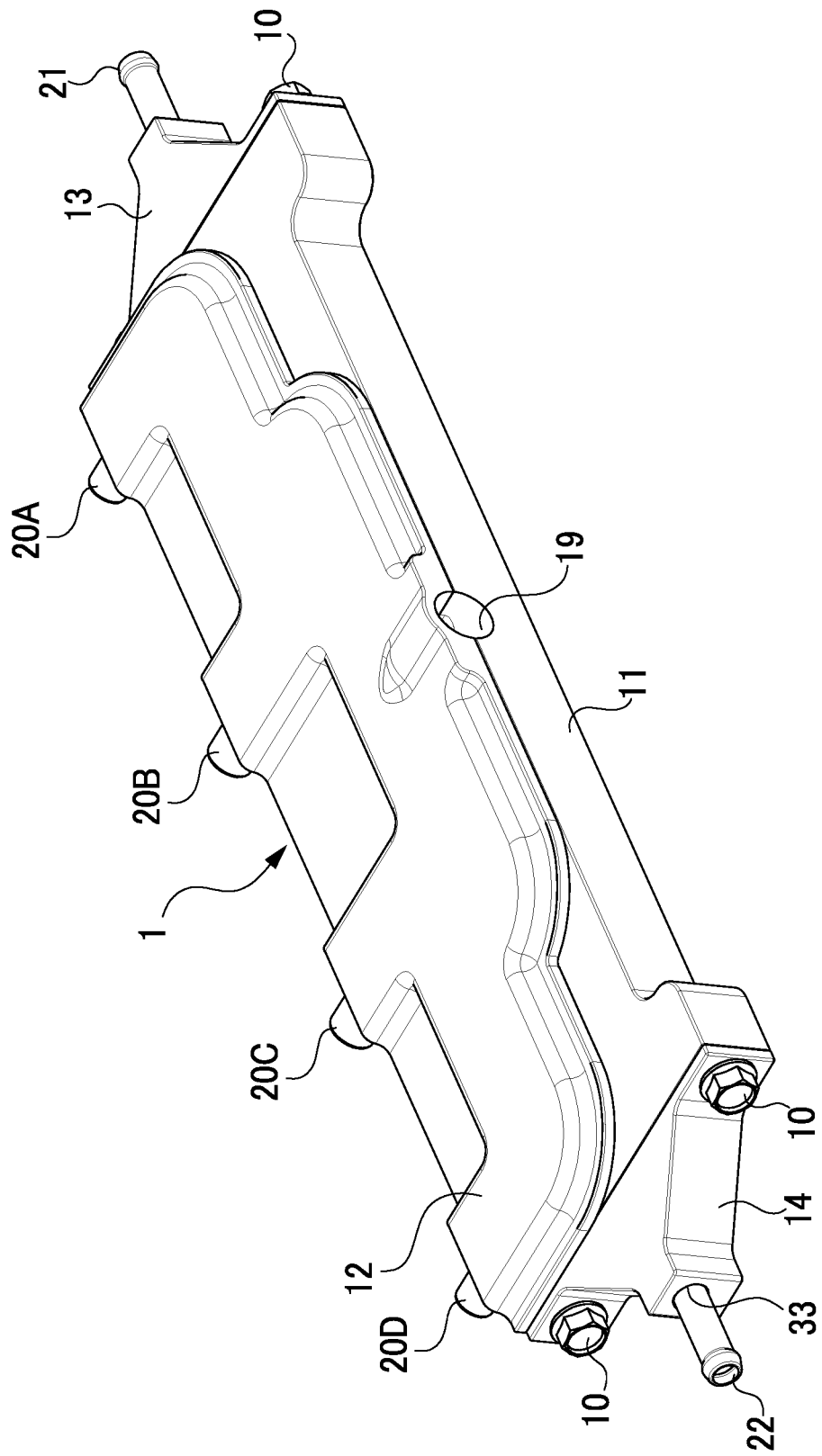
FIG. 8 is a perspective view of the EGR gas distributor seen from the rear side in the first embodiment.
Figure 9:
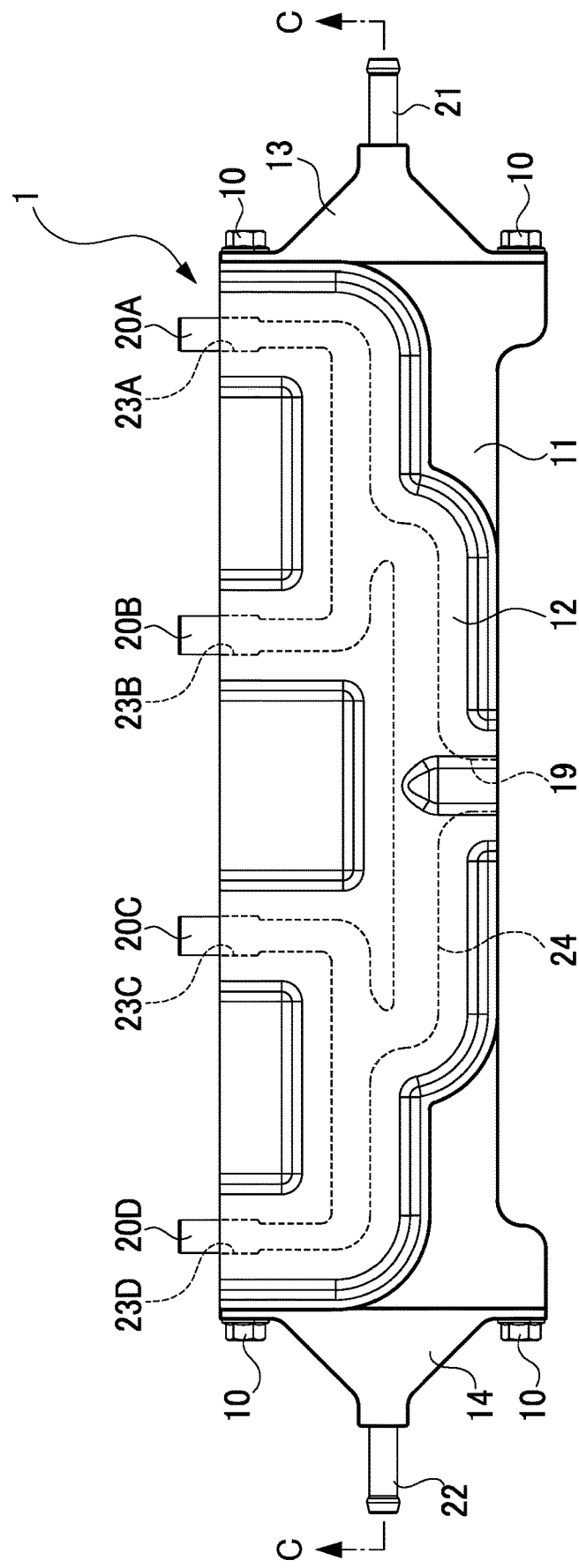
FIG. 9 is a plan view of the EGR gas distributor in the first embodiment.
Figure 10:
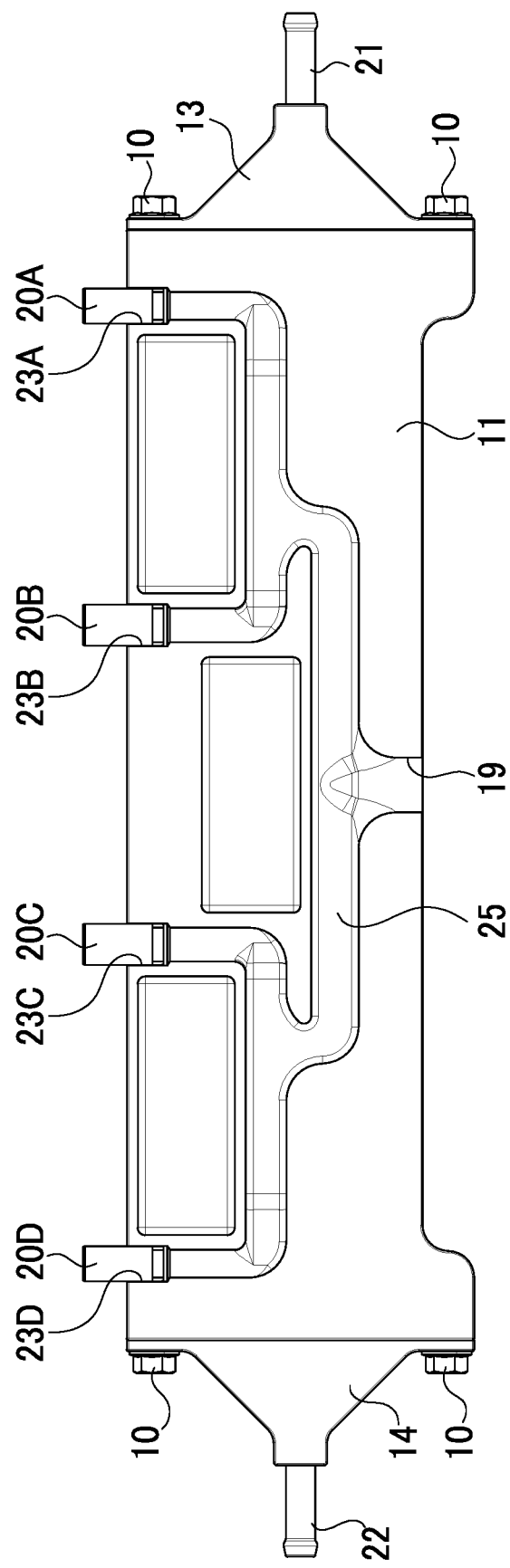
FIG. 10 is a plan view of the EGR gas distributor in FIG. 9, from which the cover member is removed, in the first embodiment.
Figure 11:
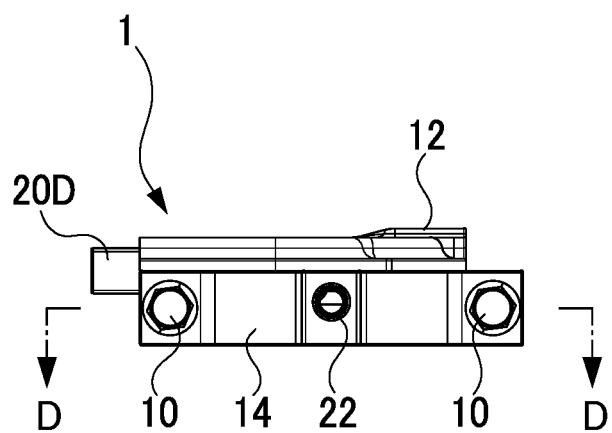
FIG. 11 is a right side view of the EGR gas distributor in the first embodiment.
Figure 12:
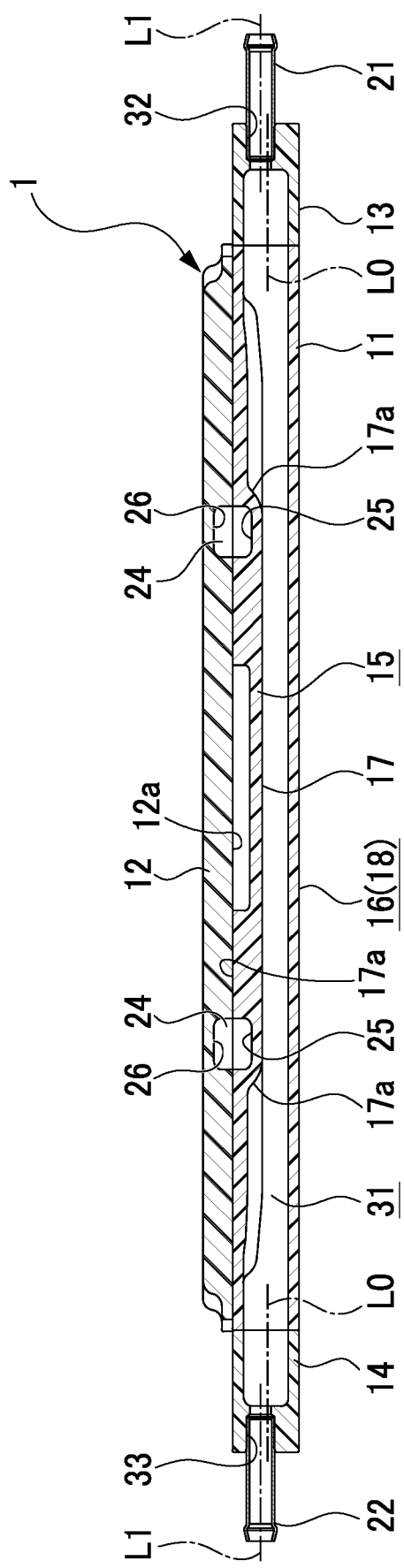
FIG. 12 is a cross-sectional view of the EGR gas distributor taken along a line C-C in FIG. 9 in the first embodiment.
Figure 13:
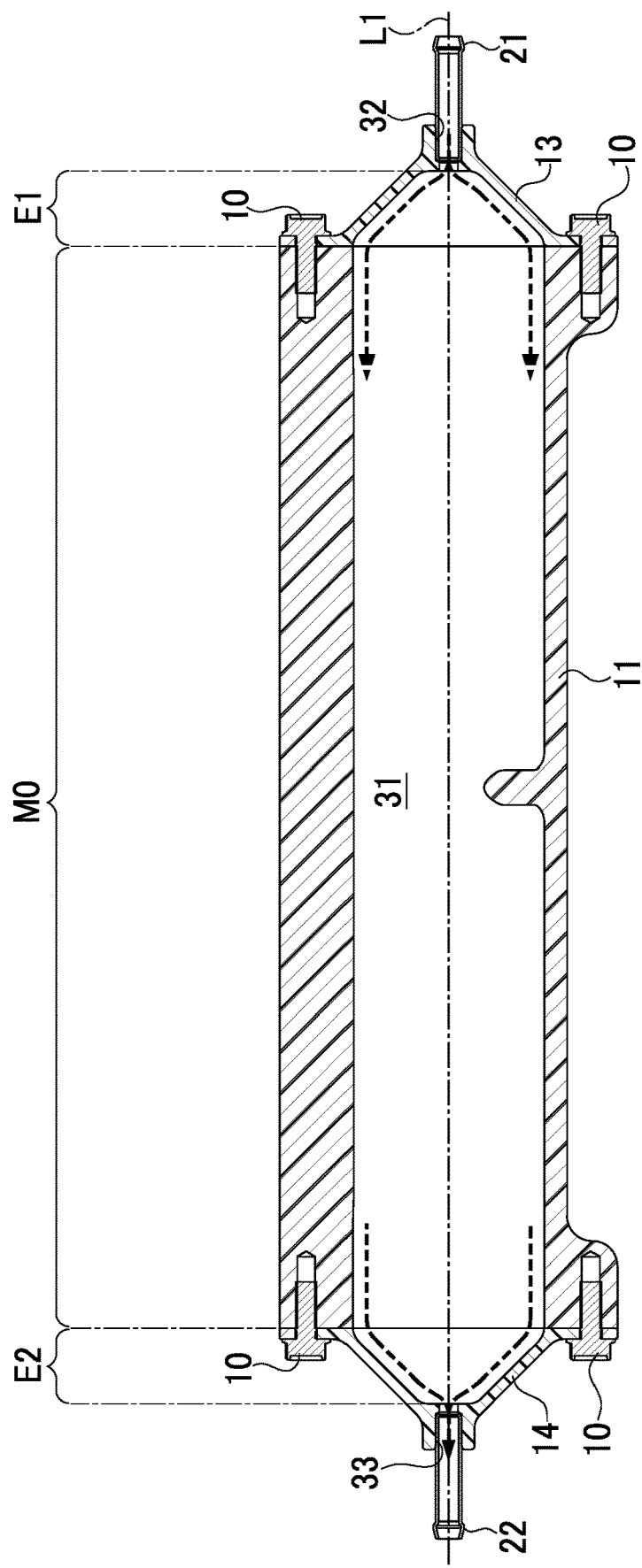
FIG. 13 is a cross-sectional view of the EGR gas distributor taken along a line D-D in FIG. 11 in the first embodiment.

FIG. 6 is a perspective view of the EGR gas distributor 1 seen from the front side. FIG. 7 is a perspective view of the EGR gas distributor 1 in FIG. 6, from which a cover member 12 is removed. FIG. 8 is a perspective view of the EGR gas distributor 1 seen from the back side. FIG. 9 is a plan view of the EGR gas distributor 1. FIG. 10 is a plan view of the EGR gas distributor 1 in FIG. 9, from which the cover member 12 is removed. FIG. 11 is a right side view of the EGR gas distributor 1. FIG. 12 is a cross-sectional view of the EGR gas distributor 1 taken along a line C-C in FIG. 9. FIG. 13 is a cross-sectional view of the EGR gas distributor 1 taken along a line D-D in FIG. 11.

As shown in FIGS. 6 to 10, the EGR gas distributor 1 entirely has a long thin box-shaped appearance and includes a body casing 11, the cover member 12 fixed to an upper surface, which is one side surface, of the body casing 11, a hot-water inflow casing 13 fixed to a left side surface of the body casing 11, and a hot-water outflow casing 14 fixed to a right side surface of the body casing 11. The body casing 11 has a long shape, concretely, a substantially rectangular shape in planar view and includes a gas distribution part 15 (see FIG. 12) to distribute EGR gas, a heating part 16 to heat the gas distribution part 15, and a partition wall 17 (see FIG. 12) that separates between the gas distribution part 15 and the heating part 16. The body casing 11 extends in a direction traversing the branch pipes 4A to 4D. In the present embodiment, the heating part 16 is constituted of a hot-water passage part 18 (see FIG. 12 and other figures) configured to allow hot water to flow therethrough. The body casing 11 includes a gas inlet port 19 (see FIG. 8 and other figures) formed at the center of the rear side of the body casing 11 and a plurality of gas outlet pipes 20A, 20B, 20C, and 20D each protruding from the front side of the body casing 11. The hot-water inflow casing 13 has a substantially triangular shape in planar view with a distal end in which a pipe joint 21 is provided extending outward therefrom. Similarly, the hot-water outflow casing 14 has a substantially triangular shape in planar view with a distal end in which a pipe joint 22 is provided extending outward therefrom. The hot-water inflow casing 13 and the hot-water outflow casing 14 are fixed to the body casing 11 with bolts 10 to close openings of the body casing 11 at both ends in the longitudinal direction. The gas inlet port 19 and each gas outlet pipe 20A to 20D are included in the gas distribution part 15. The hot-water inflow casing 13, hot-water outflow casing 14, and pipe joints 21 and 22 are included in the hot-water passage part 18. The body casing 11, cover member 12, hot-water inflow casing 13, and hot-water outflow casing 14 can be made of resin. In particular, the body casing 11 and the cover member 12 can be made of a resin material having good thermal conductivity. For example, the resin material having good thermal conductivity can be a resin material mixed with carbon powder.

(Gas Distribution Part)

The gas distribution part 15 includes, as shown in FIGS. 4 to 10, the single gas inlet port 19 configured to allow EGR gas to flow in the gas distribution part 15, a plurality of gas outlet ports 23A, 23B, 23C, and 23D respectively connected to the branch pipes 4A, 4B, 4C, and 4D through the gas outlet pipes 20A, 20B, 20C, and 20D, and a gas passage 24 configured to extend by branching off into a plurality of branch sections from the gas inlet port 19 to the gas outlet ports 23A to 23D. In the gas outlet ports 23A to 23D, the corresponding gas outlet pipes 20A to 20D are respectively fixedly fitted. In the present embodiment, the gas passage 24 has a tournament branch shape that extends by stepwise branching off from the gas inlet port 19 to the gas outlet ports 23A to 23D and is symmetric about the gas inlet port 19, as indicated by broken lines in FIG. 9. In the present embodiment, the partition wall 17 has an upper surface 17b (one side surface) formed with a recess 25, in a groove shape, having the tournament branch shape (see FIG. 12), so that the gas passage 24 is formed by the recess 25 in cooperation with the cover member 12 that covers the recess 25. In the present embodiment, the cover member 12 also has an inner surface 12a formed with a recess 26 (see FIG. 12) having the tournament branch shape matching the recess 25 of the body casing 11. Those upper recess 26 and lower recess 25 cooperatively constitute the gas passage 24. In the present embodiment, the gas passage 24 is designed such that the pressure loss between the gas inlet port 19 and each of the gas outlet ports 23A to 23D is equal between the branch passages of the gas passage 24. The gas inlet port 19 can be connected to an EGR passage for supplying EGR gas through an EGR valve.

(Hot-Water Passage Part)

The hot-water passage part 18 is provided adjacent to the entire gas distribution part 15 (the gas passage 24) through the partition wall 17 to heat the gas distribution part 15 as shown in FIGS. 4, 5, 12, and 13. The hot-water passage part 18 includes a hot-water passage 31 configured to allow hot water to flow therethrough, a hot-water inlet port 32 configured to allow hot water to flow in the hot-water passage 31, and a hot-water outlet port 33 configured to allow hot water to flow out of the hot-water passage 31. The hot-water inlet port 32 is formed in the hot-water inflow casing 13. In this inlet port 32, the pipe joint 21 is fixedly fitted. The hot-water outlet port 33 is formed in the hot-water outflow casing 14. In this outlet port 33, the pipe joint 22 is fixedly fitted. Each of the pipe joints 21 and 22 is connected to a pipe to allow engine cooling water (hot water) to flow. As shown in FIG. 12, the hot-water inlet port 32 and the hot-water outlet port 33 are aligned on one imaginary line, i.e., the same imaginary line L1 that is parallel to an axis line L0 of the body casing 11 in a longitudinal direction. In the present embodiment, as shown in FIG. 12, the imaginary line L1 is in a position displaced above the axis line L0 of the body casing 11 (i.e., displaced closer to the gas passage 24 relative to the axis line L0) in FIG. 12.

The hot-water passage 31 extends in the longitudinal direction of the body casing 11, hot-water inflow casing 13, and hot-water outflow casing 14 as shown in FIG. 13. The hot-water passage 31 includes a first end part E1 and a second end part E2, located at both ends in the longitudinal direction, and a middle part M0 located between the first end part E1 and the second end part E2. In the present embodiment, the first end part E1 of the hot-water passage 31 is constituted of the hot-water inflow casing 13, the second end part E2 is constituted of the hot-water outflow casing 14, and the middle part M0 is constituted of the body casing 11. The hot-water inflow casing 13 has the distal end in which the hot-water inlet port 32 is placed. The first end part E1 of the hot-water passage 31 has a shape widening from the hot-water inlet port 32 toward the middle part M0. In contrast, the hot-water outflow casing 14 has the distal end in which the hot-water outlet port 33 is placed. The second end part E2 of the hot-water passage 31 has a shape widening from the hot-water outlet port 33 toward the middle part M0.

In the hot-water passage 31, the portion of the partition wall 17 that forms the gas passage 24 is designed to be thicker than other portions and project into the hot-water passage 31 as shown in FIG. 12. Herein, for stable transfer of the heat of hot water to the gas passage 24, it is necessary to ensure adequate flow velocity of hot water in the hot-water passage 31. Therefore, the projected portion of the partition wall 17 is formed with a convex curved surface 17*a* with a smooth edge in order to minimize the pressure loss of hot water caused by the projected portion.

According to the configuration of the present embodiment described above, the EGR gas distributor 1 will be attached to the intake manifold 2 mounted in the engine. While the EGR gas distributor 1 is in this attachment state, during engine cold state, cooling water (hot water) flows through the hot-water passage part 18 corresponding to the heating part 16. This heating part 16 is provided adjacent to the entire gas distribution part 15, so that the inner wall of the overall gas passage 24 is quickly warmed by the heat of the heating part 16. In the hot-water passage part 18, specifically, the hot water introduced into the hot-water passage 31 through the hot-water inlet port 32 flows through the hot-water passage 31 and then flows out through the hot-water outlet port 33. Herein, since the hot-water passage part 18 is placed adjacent to the entire gas distribution part 15, the inner wall of the overall gas passage 24 is quickly warmed by the heat of hot water flowing through the hot-water passage 31 of the hot-water passage part 18. Furthermore, in the gas distribution part 15, EGR gas introduced into the gas passage 24 through the gas inlet port 19 is distributed to each of the branch pipes 4A to 4D through each of the corresponding gas outlet ports 23A to 23D. Herein, the gas passage 24 extends by stepwise branching from the gas inlet port 19 to the gas outlet ports 23A to 23D, thus taking a tournament branch shape symmetric about the gas inlet port 19. Accordingly, the EGR gas introduced into the gas passage 24 through the gas inlet port 19 is evenly split at each junction toward the gas outlet ports 23A to 23D in a stepwise manner until the split streams of EGR gas reach the gas outlet ports 23A to 23D. This configuration can effectively quickly warm the gas passage 24 while enhancing the performance of distributing EGR gas. In addition, since the heating part 16 is constituted of the hot-water passage part 18, for example, engine cooling water can be utilized as hot water. Thus, the inner wall of the entire gas passage 24 can be warmed by use of the hot water such as engine cooling water from an early stage during engine cold start without needing an electric structure such as an electric heater or energy. This can suppress the generation of condensed water on the inner wall of the gas passage 24, thus enabling start of EGR with respect to an engine from an early stage during cold start.

According to the configuration in the present embodiment, the gas distribution part 15, the hot-water passage part 18, and the partition wall 17 can be made integrally in the body casing 11. Further, the recess 25 having the tournament branch shape is formed in one side surface (the upper surface 17*b*) of the partition wall 17. This recess 25 forms the gas passage 24 in cooperation with the cover member 12 placed to cover the recess 25. Accordingly, the gas passage 24 can be formed more easily than when a gas passage is formed by only the body casing 11. Thus, the EGR gas distributor can be easily designed with a desired configuration without increasing its dimension.

According to this configuration in the present embodiment, the first end part E1 of the hot-water passage 31 (the hot-water inflow casing 13) takes the shape widening from the hot-water inlet port 32 toward the middle part M0 (the body casing 11), thus allowing the hot water introduced into the hot-water passage 31 through the hot-water inlet port 32 to flow so as to spread into the entire area of the hot-water passage 31. Further, the second end part E2 (the hot-water outflow casing 14) of the hot-water passage 31 forms a shape widening from the hot-water outlet port 33 toward the middle part M0 (the body casing 11), thus allowing the hot water flowing through the hot-water passage 31 to flow to converge on the hot-water outlet port 33. Consequently, the hot water is made to smoothly flow through the hot-water passage 31. This smooth flow is also enhanced by the placement of the hot-water inlet port 32 and the hot-water outlet port 33 aligned on the same imaginary line L1. This makes it possible to ensure the sufficient flow velocity of hot water flowing through the hot-water passage 31 and hence enhance the performance of heat transmission from the hot-water passage part 18 (the hot-water passage 31) to the gas distribution part 15 (the gas passage 24).

In the present embodiment, the imaginary line L1 on which the hot-water inlet port 32 and the hot-water outlet port 33 are aligned is located at a position displaced closer to the gas passage 24 relative to the axis line L0 of the body casing 11. Thus, the center line of the flow of hot water directed from the hot-water inlet port 32 toward the hot-water outlet port 33 is displaced closer to the gas passage 24. In this regard, the gas passage 24 can be effectively warmed by hot water.

Second Embodiment

Next, a second embodiment of the EGR gas distributor will be described below with reference to the attached drawings.

In the following description, identical or similar parts to those in the first embodiment are assigned the same reference signs as in the first embodiment and their details are not repeated. Thus, the following description will be given with a focus on differences from the first embodiment.

Figure 14:
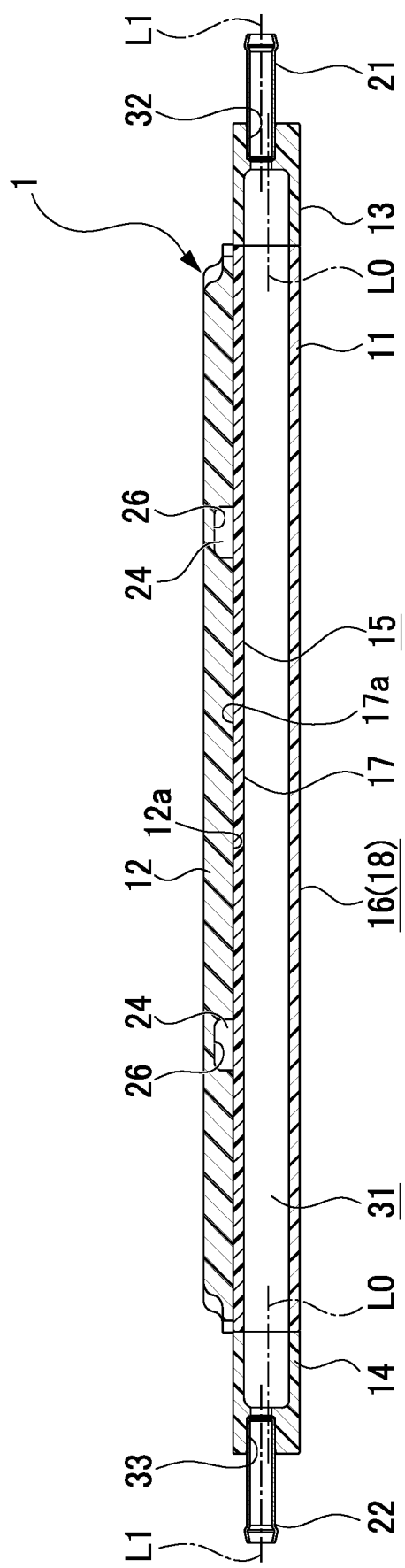
FIG. 14 is a cross-sectional view of an EGR gas distributor in a second embodiment, corresponding to FIG. 12.

The present embodiment differs from the first embodiment in the configuration of the gas passage 24. FIG. 14 is a cross-sectional view of the EGR gas distributor 1 in the second embodiment, corresponding to FIG. 12. In the first embodiment described above, both the partition wall 17 and the cover member 12 are respectively provided with the recess 25 and the recess 26 to cooperatively form the gas passage 24. In contrast, in the present embodiment, the partition wall 17 is provided with no recess, whereas only the cover member 12 is provided with the recess 26 as shown in FIG. 14. Specifically, the recess 26 is formed in a tournament branch shape only in the inner surface 12*a* of the cover member 12. Thus, the gas passage 24 is formed by the recess 26 of the cover member 12 placed on the partition wall 17 so that the inner surface 12*a* of the cover member 12 overlaps with one side surface (the upper surface 17*b*) of the partition wall 17 to cover the partition wall 17.

According to the configuration of the present embodiment, the gas distribution part 15, the hot-water passage part 18, and the partition wall 17 can be made integrally in the body casing 11. Further, the recess 26 having the tournament branch shape is formed in the inner surface 12*a* of the cover member 12 to be joined with the partition wall 17. The cover member 12 is placed to cover the partition wall 17 such that the inner surface 12*a* of the cover member 12 overlaps with the one side surface (the upper surface 17*b*) of the partition wall 17 to form the gas passage 24. Thus, the gas passage 24 can be more easily formed than the gas passage 24 formed by only the body casing 11. Furthermore, since the partition wall 17 is formed with no recess, the partition wall 17 has no portion projected into the hot-water passage 31. Thus, the EGR gas distributor 1 can be easily designed with a desired configuration without increasing its dimension and further can eliminate the pressure loss of hot water due to a projected portion of the partition wall 17.

The present disclosure is not limited to each of the aforementioned embodiments and may be embodied in other specific forms without departing from the essential characteristics thereof.

In each of the foregoing embodiments, the EGR gas distributor 1 is used to distribute EGR gas to each of the branch pipes 4A to 4D of the intake manifold 2. As an alternative, this EGR gas distributor 1 may be used to distribute auxiliary gas (e.g., PCV gas) other than EGR gas to each of the branch pipes 4A to 4D of the intake manifold 2.

In each of the foregoing embodiments, the hot-water inflow casing 13 and the hot-water outflow casing 14 each having a substantially triangular shape in planar view are fixed to both ends of the body casing 11 in the longitudinal direction to close the openings at both ends. As an alternative, the openings of the body casing at both ends in the longitudinal direction may be closed with simple flat plates. In addition, the shape and the size of the EGR gas distributor may be appropriately changed.

In each of the foregoing embodiments, the EGR gas distributor 1 is configured to adapt to the intake manifold 2 with four branch pipes 4A to 4C. The EGR gas distributor, however, can be configured irrespective of the number of branch pipes.

In each of the foregoing embodiments, the heating part 16 is constituted of the hot-water passage part 18. As an alternative, the heating part may be constituted of an electric heater.

In each of the foregoing embodiments, the cooling water of an engine is used as the hot water allowed to flow through the hot-water passage part 18. As an alternative, any hot water other than the engine cooling water may be used.

In the first embodiment, the recess 25 is provided in the partition wall 17 and the recess 26 is provided in the cover member 12 to form the gas passage 24. As an alternative, the recess in the cover member may be dispensed with.

INDUSTRIAL APPLICABILITY

The present disclosure is utilizable in an EGR device and a PCV device provided in an engine system.

REFERENCE SIGNS LIST

1 EGR gas distributor
2 Intake manifold
3 Surge tank
4A to 4D Branch pipe
11 Body casing
12 Cover member
13 Hot-water inflow casing
14 Hot-water outflow casing
15 Gas distribution part
16 Heating part
17 Partition wall
18 Hot-water passage part
19 Gas inlet port
20A to 20D Gas outlet pipe
23A to 23D Gas outlet port
24 Gas passage
25 Recess
26 Recess
31 Hot-water passage
32 Hot-water inlet port
33 Hot-water outlet port
L0 Axis line of body casing
L1 Imaginary line
E1 First end part
E2 Second end part
M0 Middle part

What is claimed is:

1. An EGR gas distributor that is an attachment device to be attached to an intake manifold and is configured to distribute EGR gas to each of a plurality of branch pipes constituting the intake manifold, the EGR gas distributor comprising:
 a gas distribution part including:
  a single gas inlet port configured to allow EGR gas to flow in the gas distribution part;

a plurality of gas outlet ports connected to each of the branch pipes; and a gas passage configured to extend by branching off into a plurality of branch sections from the gas inlet port to each of the gas outlet ports, the gas passage having a tournament branch shape that extends by stepwise branching off from the gas inlet port to each of the gas outlet ports and is symmetric about the gas inlet port; and a heating part provided adjacent to the entire gas distribution part to heat the gas distribution part.

2. The EGR gas distributor according to claim 1, wherein the heating part is constituted of a hot-water passage part configured to allow hot water to flow therethrough, the hot-water passage part including:

a hot-water passage configured to allow hot water to flow therethrough;

a hot-water inlet port configured to allow the hot water to flow in the hot-water passage; and a hot-water outlet port configured to allow the hot water to flow out of the hot-water passage.

3. The EGR gas distributor according to claim 2 further comprising:

a casing including:
   the gas distribution part;
   the hot-water passage part; and
   a partition wall that separates between the gas distribution part and the hot-water passage part; and a cover member that covers one side surface of the partition wall, wherein the partition wall is formed, in the one side surface, with a recess having the tournament branch shape, and the gas passage is formed by the recess of the partition wall in cooperation with the cover member that covers the recess.

4. The EGR gas distributor according to claim 3, wherein the casing has a long shape, in which the hot-water passage extends in a longitudinal direction of the casing, the casing includes a first end part and a second end part in the longitudinal direction, and a middle part located between the first end part and the second end part, the first end part has a distal end in which the hot-water inlet port is placed, the first end part having a shape widening from the hot-water inlet port toward the middle part, and the second end part has a distal end in which the hot-water outlet port is placed, the second end part having a shape widening from the hot-water outlet port toward the middle part.

5. The EGR gas distributor according to claim 3, wherein the hot-water inlet port and the hot-water outlet port are aligned on a same imaginary line that is parallel to an axis line of the casing in a longitudinal direction, and the imaginary line is in a position displaced closer to the gas passage relative to the axis line of the casing.

6. The EGR gas distributor according to claim 2 further comprising:

a casing including:
   the gas distribution part;
   the hot-water passage part; and
   a partition wall that separates between the gas distribution part and the hot-water passage part; and a cover member that covers one side surface of the partition wall, wherein the cover member has an inner surface formed with a recess having the tournament branch shape, and the gas passage is formed by the recess of the cover member placed so that the inner surface of the cover member overlaps with the one side surface of the partition wall.

7. The EGR gas distributor according to claim 6, wherein the casing has a long shape, in which the hot-water passage extends in a longitudinal direction of the casing, the casing includes a first end part and a second end part in the longitudinal direction, and a middle part located between the first end part and the second end part, the first end part has a distal end in which the hot-water inlet port is placed, the first end part having a shape widening from the hot-water inlet port toward the middle part, and the second end part has a distal end in which the hot-water outlet port is placed, the second end part having a shape widening from the hot-water outlet port toward the middle part.

8. The EGR gas distributor according to claim 6, wherein the hot-water inlet port and the hot-water outlet port are aligned on a same imaginary line that is parallel to an axis line of the casing in a longitudinal direction, and the imaginary line is in a position displaced closer to the gas passage relative to the axis line of the casing.

* * * * *